United States Patent Office 2,764,432
Patented Sept. 25, 1956

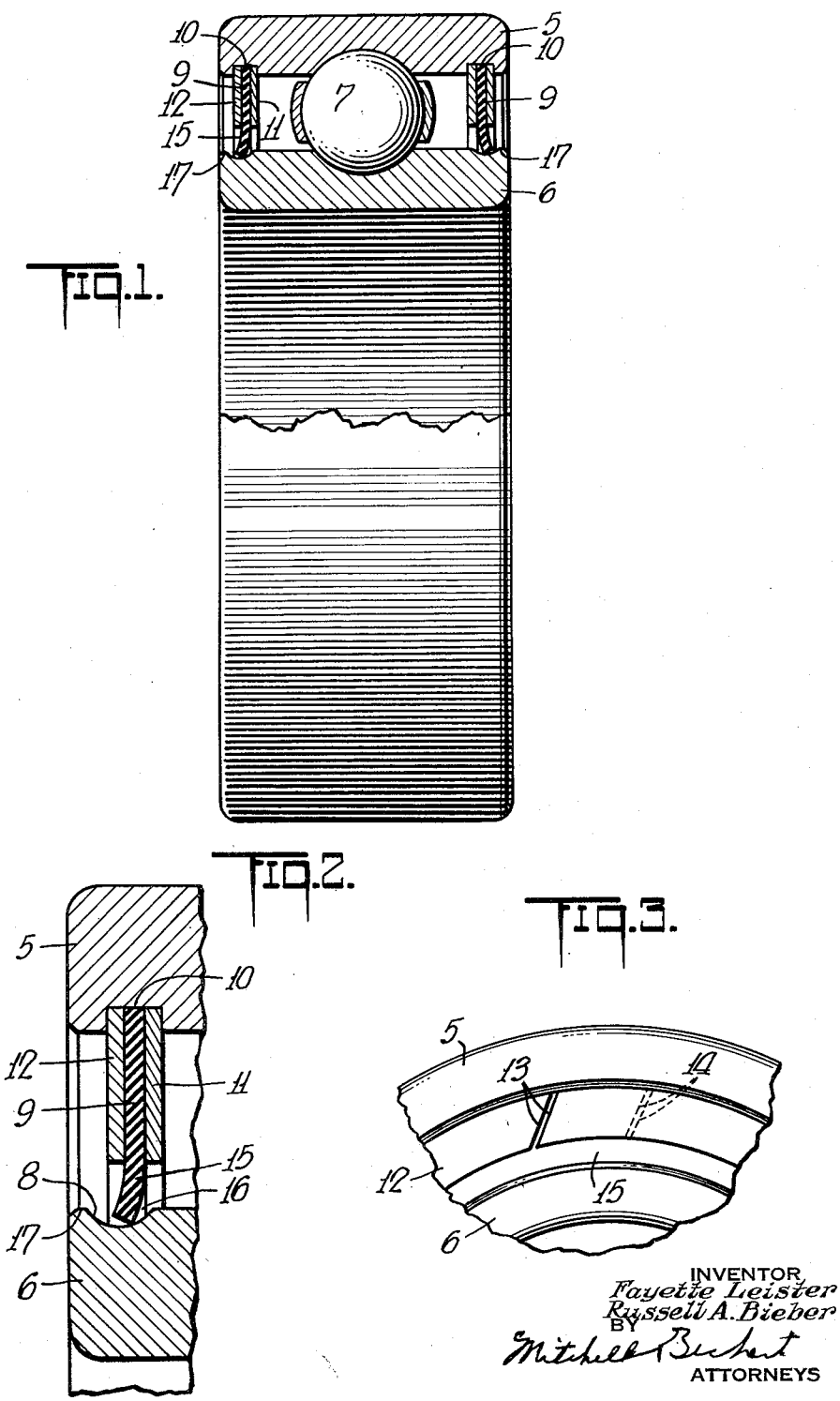

2,764,432
BEARING SEAL

Fayette Leister and Russell A. Bieber, New Britain, Conn., assignors to The Fafnir Bearing Company, New Britain, Conn., a corporation of Connecticut Application June 4, 1952, Serial No. 291,704

1 Claim. (Cl. 286—5)

Our invention relates to a bearing seal and is in the nature of an improvement on the bearing seal of Reynolds and Hilles Patent No. 2,281,010, April 28, 1942. This application is a continuation in part of our application Serial No. 790,604, filed December 9, 1947, now abandoned.

The seal is particularly adaptable for incorporation in a ball bearing or other bearing in which inner and outer bearing rings are assembled one within the other and are held in radially spaced apart relationship and against substantial axial movement relatively to each other.

It is the general object of the invention to provide an improved bearing seal which will effectively exclude foreign matter from the bearing and retain lubricant.

It is a further object to provide an improved bearing seal of the contact type, which will be highly effective as a seal and yet will operate in a practically frictionless manner.

It is another object to provide an improved bearing seal of the general character indicated, which is simple in construction, easily assembled, and which may be manufactured at low cost.

Other objects and various features of novelty and invention will be hereinafter pointed out or will become apparent to those skilled in the art.

In the drawings which show, for illustrative purposes only, a preferred form of the invention—

Fig. 1 is an edge view in quarter section of a ball bearing embodying the invention;

Fig. 2 is an enlarged fragmentary section of a part of Fig. 1; and

Fig. 3 is an enlarged fragmentary side view of the bearing shown in Fig. 1.

The bearing illustrated includes an outer ring 5, an inner ring 6, with interposed balls 7 traveling in facing grooves in the two rings. The bearing rings, as is usual in bearings of this type, are one within the other and are held by the balls in radially spaced apart relationship and against substantial axial relative movement. The bearing may be sealed at each side of the balls or only at one side, as may be desired, and a description of a seal at one side of the bearing will suffice.

One of the bearing rings (in this case the inner ring) is provided with an annular groove 8 in the circumferential surface facing the other ring. The groove 8 may be and preferably is of generally arcuate shape in section, and is positioned adjacent to but terminates short of the end of the bearing ring. Thus, the inner bearing ring at the end having a groove may be of substantially the full thickness of the ring and may therefore present substantially a full-ring thickness to abut a shaft shoulder or the like, and has sufficient thickness ordinarily to provide a pull-off shoulder for removal of the ring from a shaft.

The ring opposite the ring having the groove (in this case the outer ring) carries a seal of resilient material lightly urged into resilient sealing engagement with a side of the groove 8 at one side of the bottom thereof. The resilient seal member is preferably stiffened or backed-up so as to give it more or less rigidity and to provide for the resilient sealing engagement heretofore noted. In the form shown, the seal ring is in the form of an annulus or washer 9, of generally flexible resilient material, and is preferably made of lubricant-resistant material, such as artificial rubber or fabric impregnated or coated with artificial rubber or the like. The seal washer 9 is preferably, though not in all cases necessarily, entirely impervious to lubricant. When the seal ring 9 is formed of sheet material of the character indicated, it is preferably backed up so as to have lateral support, except at the annular portion thereof which forms the contact seal with the side of the groove 8. In the form illustrated, I provide lateral support or backing for the seal washer 9 at both sides. Such backing may be conveniently provided by a pair of washers or annular plates embracing the seal ring 9 at opposite sides and held in the outer ring.

In the form illustrated, the ring carrying the seal 9 is provided with a groove 10 and backing-up or stiffening disks or washers 11—12 are sprung into or otherwise entered in the groove 10 so as to be secured to the outer ring 5 and embrace the seal ring 9 between them. Such backing washers are preferably formed of thin spring steel and split as indicated at 13 for the outer washer 12, and at 14 for the inner washer 11. Such split rings are easily inserted and removed and serve to hold the seal disk 9 with the desired degree of security. The washers 11—12 extend part way across the space between the inner and outer bearing rings but terminate short of the ring having the groove so as to leave a generally unsupported resilient annulus 15 projecting beyond the washers and into the groove. The seal ring means may thus be said to include a relatively reinforced or stiff portion extending substantially across the space between the rings 5—6 and into radial clearance relation with the groove 8; the seal ring means may be said further to include a thin relatively resilient annular inner portion 15 generally covering the radial space between the stiff outer portion and the groove 8 and contacting a part of the latter.

The groove 8 and the seal ring 9, together with its support or supports, are so related to each other that the inner annulus 15 is resiliently flexed into light sealing contact with a side of the groove 8 to the axially inner side of the bottom thereof. This may be accomplished by proportioning the bore diameter of the resilient annulus 15 to substantially the minimum diameter of the groove 8 and by so axially locating the juncture of the reinforced and the unreinforced parts of the seal ring means that the juncture lies effectively axially between the bottom of the groove and the inner axial limit of the groove 8. As illustrated, the washers 11—12 are plain, flat washers, and therefore the groove 10 is generally axially inwardly of the bottom of the groove 8 so as to provide for the flexing of the annular portion 15 of the seal ring. The effective thickness of the annular portion 15 is preferably no greater than one-half the maximum axial extent of the groove 8. It will be seen that the annular portion 15 of the seal ring is held in light sealing engagement with a side of the groove 8 at one side of the bottom thereof. Any pressure on the outside of the annular portion 15 serves to enhance the contact with the side of the groove 8 and thus more securely seal the bearing against the entry of any foreign matter incident to the pressure on the outside of the annular portion 15. It will also be noted that since the sealing contact is ordinarily very light, there will be very little friction between the seal ring and the side of the groove when the bearing is in operation. Furthermore, due to the light sealing action, the bearing is permitted to breathe freely; that is to say, any increased air pressure inside the bearing, due to heating up of the air within the bearing or in the lubricant, will be permitted to escape freely simply by forcing the seal ring 9 slightly off its seat in the groove. As soon as the air has escaped, the inherent resiliency of the seal ring will again securely seal the bearing.

The groove 8 is preferably of such form in relation to the form of the seal ring 9 that there is a well or trough, as indicated at 16, for permitting some lubricant to reach the rubbing surfaces between the seal ring and that part of the groove with which it is in contact. This condition may be assured by locating the axially inner surface of the inner annular portion 15 (that is, the portion of said axially inner surface adjacent the junction of the resilient annulus 15 with the relatively reinforced portion 9—11—12 of the seal ring means) axially outwardly from the inner axial limit of the groove 8. Thus, the contact surfaces will be fully lubricated and friction further reduced.

By way of more exactly defining the presently disclosed arrangement, it may be stated that the unstressed bore diameter of the seal ring 9 is preferably substantially equal to the minimum diameter of the groove 8; and what might be called the principal radial plane of support of the annular inner portion 15 is located generally axially inwardly of the plane of minimum depth of the groove 8 and axially outwardly of the axially inner limit of the groove 8. Such relative location and proportioning of the parts will be appreciated as inherently effecting a relatively light axially flexed contact of the inner edge of the seal 9 against the inner side of the bottom of groove 8.

The groove 8 has been described as being adjacent to but terminating short of the end of the ring. One purpose of this particular construction has been described as leaving the ring of substantially full thickness to abut a shoulder. Another purpose of this construction is to provide a radially outwardly extending surface, terminating, say, at the edge 17 of the groove so as to act as a flinger, tending to throw foreign matter away from the sealing contact between the seal ring and the side of the groove.

Bearings constructed substantially as herein shown and described have proven highly satisfactory in actual service. The seals are very effective as seals, and the flinger action of the outside of the groove tends to exclude foreign matter and thus enhance the effectiveness of the seal as a whole. With our construction, the seal contact may be wholly axially inwardly of the axially outer limit of the groove so as to leave a clearance for the application of a ring-pulling tool over the axially outer groove limit without damaging contact with the seal. The construction may also be characterized by relatively light friction because of the essentially line-contact nature of the seating engagement. Furthermore, a complete, more or less symmetrical groove 8 is much easier to form than a curved, turned-down end extending completely to the end of the bearing ring.

While the invention has been described in considerable detail and a preferred form illustrated, it is to be understood that various changes may be made within the scope of the invention as defined in the appended claim.

We claim:

In a seal-ring for a bearing comprising relatively rotatable rings, one within the other and held in radially spaced-apart relationship and against substantial relative axial movement, the inner of said rings having a circumferential generally arcuate-shaped groove facing the inner surface of said outer ring, said groove being located adjacent one end of said inner ring but terminating short of said end, a seal-ring supported and axially located by said outer ring and including a relatively reinforced portion extending substantially across the space between said rings and into radial-clearance relation with said groove, said seal ring further including a relatively resilient annular inner portion, the thickness of said resilient annular inner portion being less than substantially one half the maximum axial extent of the groove, the bore diameter of said inner annular portion when supported by said outer ring and when in an axially unstressed condition being substantially the minimum groove diameter, the axially inner surface of said inner annular portion adjacent the effective junction between said relatively reinforced portion and said relatively resilient portion being axially outwardly spaced from the inner axial limit of the groove and being also spaced axially inwardly of the bottom of the groove, whereby the inner edge of said annular portion will be maintained in light resilient contact with the arcuate side of the groove axially inwardly of the bottom thereof.

References Cited in the file of this patent

UNITED STATES PATENTS

| Re. 21,584 | Brodin | Oct. 1, 1940 |
| 2,273,380 | Searles | Feb. 17, 1942 |
| 2,276,225 | Carter | Mar. 10, 1942 |
| 2,281,010 | Reynolds et al. | Apr. 28, 1942 |
| 2,336,913 | Albrecht | Dec. 14, 1943 |
| 2,467,049 | Peterson | Apr. 12, 1949 |
| 2,566,448 | Heintz et al. | Sept. 4, 1951 |

FOREIGN PATENTS

| 978,288 | France | Nov. 22, 1950 |
| 508,640 | Great Britain | July 4, 1939 |